United States Patent
Fukuda et al.

(10) Patent No.: US 7,856,353 B2
(45) Date of Patent: Dec. 21, 2010

(54) METHOD FOR PROCESSING SPEECH SIGNAL DATA WITH REVERBERATION FILTERING

(75) Inventors: Takashi Fukuda, Yokohama (JP);
Osamu Ichikawa, Yokohama (JP);
Masafumi Nishimura, Yokohama (JP)

(73) Assignee: Nuance Communications, Inc., Burlington, MA (US)

( * ) Notice: Subject to any disclaimer, the term of this patent is extended or adjusted under 35 U.S.C. 154(b) by 805 days.

(21) Appl. No.: 11/834,964

(22) Filed: Aug. 7, 2007

(65) Prior Publication Data
US 2009/0043570 A1 Feb. 12, 2009

(51) Int. Cl.
G10L 19/02 (2006.01)
G10L 15/20 (2006.01)
G10L 13/06 (2006.01)
H04B 3/20 (2006.01)
H03G 3/00 (2006.01)
A61F 11/06 (2006.01)

(52) U.S. Cl. ............... 704/211; 704/203; 704/204; 704/233; 704/262; 381/66; 381/63; 381/71.12

(58) Field of Classification Search ............ 704/211, 704/203, 204, 233, 262; 381/66, 63, 71.12
See application file for complete search history.

(56) References Cited

U.S. PATENT DOCUMENTS

| | | | |
|---|---|---|---|
| 5,774,562 A * | 6/1998 | Furuya et al. | 381/66 |
| 7,054,451 B2 * | 5/2006 | Janse et al. | 381/83 |
| 7,099,822 B2 * | 8/2006 | Zangi | 704/226 |
| 7,508,948 B2 * | 3/2009 | Klein et al. | 381/66 |
| 2006/0210089 A1 * | 9/2006 | Tashev et al. | 381/66 |

FOREIGN PATENT DOCUMENTS

| JP | PUPA2001-251167 | 9/2001 |
|---|---|---|
| JP | PUPA2001-228621 | 8/2004 |

(Continued)

OTHER PUBLICATIONS

J. R. Hopgood and C. Evers, "Block-based TVAR models for singlechannel blind dereverberation of speech from a moving speaker," in Proc. IEEE Conf. SSP, 2007, pp. 274-277.*

(Continued)

*Primary Examiner*—James S Wozniak
*Assistant Examiner*—Edgar Guerra-Erazo
(74) *Attorney, Agent, or Firm*—Wolf, Greenfield & Sacks, P.C.

(57) ABSTRACT

Method for processing speech signal data. A speech signal is divided into frames. Each frame is characterized by a frame number T representing a unique interval of time. Each speech signal is characterized by a power spectrum with respect to frame T and frequency band ω. A speech segment and a reverberation segment of the speech signal is determined. L filter coefficients $W(k)$ ($k=1, 2, \ldots, L$) respectively corresponding to L frames immediately preceding frame T are computed such that the L filter coefficients minimize a function $\Phi$ that is a linear combination of sum of squares of a residual speech power in the reverberation segment and a sum of squares of a subtracted speech power in the speech segment. The computed L filter coefficients are stored within storage media of the computing apparatus.

13 Claims, 8 Drawing Sheets

FOREIGN PATENT DOCUMENTS

JP  PUPA2004-347761  12/2004
JP  2005-347761  12/2005

OTHER PUBLICATIONS

S. G. Chamberlain and J. C. Galli, "A model for numerical simulation of nonstationary sonar reverberation using linear spectral prediction", IEEE J. Oceanic Eng., vol. OE-8, pp. 21-36, 1983.*

J. P. Bloom and G. P. Cain, "Evaluation of two input speech dereverberation techniques", Proc. ICASSP'82, pp. 164-167.*

K. Kinoshita, T. Nakatani and M. Miyoshi "Fast estimation of a precise dereverberation filter based on speech harmonicity", Proc. IEEE Int. Conf. Acoust., Speech, Signal Process. (ICASSP), pp. 1073 2005.*

Emura and Kataoka (NTT Cyberspace Laboratories); Concerning Blind Dereverberation from Multi-Channel Speech Signals; Spring Meeting of the Acoustical Society of Japan, Mar. 2006. Japanese Document-2 pages; English Translation-6 pages.

Kinoshita et al.; Single channel blind dereverberation using multi-step forward linear prediction; 6 pages (English Translation 4 pages and Japanese Document pp. 511-512).

Nakamura et al.; A method of reverberation compensation based on short time spectral analysis; 6 pages (English Translation 4 pages and Japanese Document pp. 103-104).

Nakatani et al.; Blind Dereverberation of Single Channel Speech Signal Based on Harmonic Structure; ICASSP 2003 IEEE; 7 pages (English I-92-I-95; Japanese Document 3 pages).

Hirobayashi et al.; Speech Waveform Recovery from a Reverberant Speech Signal using Inverse Filtering of the Power Envelope Transfer Function; 23 pages (English Translation 15 pages and Japanese Document pp. 1323-1330).

* cited by examiner

METHOD FOR PROCESSING SPEECH SIGNAL DATA WITH REVERBERATION FILTERING

RELATED APPLICATION

This application is related to U.S. patent application Ser. No. 11/834,756, filed Aug. 7, 2007, and entitled "Method and Apparatus for Processing Speech Signal Data".

FIELD OF THE INVENTION

The present invention relates to a low-cost method for processing speech signal data and more particularly for determining a filter coefficient for dereverberation in a speech power spectrum.

BACKGROUND OF THE INVENTION

It is generally known that performance of an automatic speech recognition apparatus is markedly degraded under an environment with long reverberation times. For this reason, it is desired that reverberation contained in observed speech should be eliminated in the form of preprocessing. Accordingly, various conventional dereverberation methods have been proposed as will be described below.

A first conventional dereverberation method deletes, from a speech power spectrum domain, a speech power spectrum of a previous frame multiplied by a coefficient. A method is disclosed on the basis of a general property that a sound power of reverberation exponentially attenuates. See reference to Nakamura, Takiguchi and Shikano, "Study on Reverberation Compensation in Short-Time Spectral Analysis," Lecture Paper Collection of the Acoustical Society of Japan, 3-6-11, pp. 103-104, March 1998. In this method, reverberation is eliminated by subtracting, from a speech power spectrum of a current frame, a previous speech power spectrum of the frame (or previous several frames) immediately before the current frame, the previous speech power spectrum multiplied by a coefficient. Note that "a frame" means a width on which a Fourier transform is operated in speech power spectra.

Although this method itself does not involve a large computation amount, a method of determining a coefficient is a problem because the coefficient depends on reverberation characteristics of a room. For this reason, there is proposed a method of determining the coefficient through a Hidden Markov Model (HMM) and an Expectation Maximization (EM) algorithm by using an acoustic model. See reference to Japanese Patent Application Laid-open Publication No. 2004-347761. However, since this method requires "supervised training" in which text of correct answers is given at the time of learning, preparatory "adaption" is a burden on a user. Additionally, this method has a disadvantage that repetitive computations of the EM algorithm require a high computation cost.

A second conventional dereverberation method uses an inverse filter. On condition that an environment where an automatic speech recognition apparatus is used is known, a filter for dereverberation can be formed by previously finding a transfer function in a room, and then by finding an inverse filter thereof. See reference to Emura and Kataoka (NTT Laboratory), "Regarding Blind Dereverberation from Multichannel Speech Signals," Proceedings of the Acoustical Society of Japan Spring Meeting (March 2006).

When the automatic speech recognition apparatus is supposed to be an embedded apparatus, implementation of plural microphones is not realistic. Additionally, designing of an inverse filter is often difficult in reality because a phase of an impulse response measured or determined as propagation characteristics is not the minimum phase in some cases.

A third conventional dereverberation method forms a transfer function by regarding comb filter outputs as original sound. A method is disclosed in which a transfer function is determined by regarding speech in a segment having a harmonic structure, as original sound without reverberation, and also by regarding speech in a segment having no harmonic structure as reverberation. In this method, processing is repeated in order to enhance performance. See reference to Nakatani, T., and Miyoshi, M., "Blind Dereverberation of Single Channel Speech Signal Based on Harmonic Structure," Proc. ICASSP-2003, vol. 1, pp. 92-95 (April 2003).

In preprocessing of automatic speech recognition, the method is considered to involve fundamental problems such as that existence of consonants is disregarded, and that fluctuation of F0 (a fundamental frequency) is premised. Additionally, a cost for computing a comb filter is large.

A fourth conventional dereverberation method shapes a power envelope by using a reverberation time. A method is disclosed in which a power envelope of a speech waveform is re-shaped into a precipitous form by using a reverberation time of a room as a parameter. See reference to Hirobayashi, Nomura, Koike, and Tohyama, "Speech Waveform Recovery from a Reverberant Speech Signal Using Inverse Filtering of the Power Envelope Transfer Function," The IEICE Transactions Vol. J81-A, No. 10 (October 1998).

In this method, it is premised that the reverberation time of the room is known in advance as previous knowledge, or that the reverberation time of the room can be determined by means of another method.

A fifth conventional dereverberation method uses multistep linear prediction. A method is disclosed in which a spectrum of a late reverberation component is subtracted from observed speech by whitening the observed speech in advance, forming linear prediction delayed by D sample in a time domain, and regarding a prediction component thereof as the late reverberation component. See reference to Kinoshita, Nakatani and Miyoshi (NTT Laboratory), "Study on Single Channel Dereverberation Method Using Multi-step Linear Prediction," Proc. of the Acoustical Society of Japan Spring Meeting (March 2006).

This method has a problem that a computation cost is high because a filter having a long tap length (D=5000 taps in the example of Kinoshita, Nakatani and Miyoshi (NTT Laboratory), "Study on Single Channel Dereverberation Method Using Multi-step Linear Prediction," Proc. of the Acoustical Society of Japan Spring Meeting (March 2006)) corresponding to a reverberation time is used. Additionally, in principle, a linear prediction component delayed by D sample is not completely equal to a reverberation component. In addition, it is expected that the linear prediction component does not become zero in a part composed of long prolonged vowel sound even in an environment without reverberation. Consequently, a spectrum subtraction may cause not only dereverberation but also degradation of original sound. In the experiment shown in the document, it is considered that the above side-effect in the environment without reverberation is avoided by also applying speech, which is previously processed in the same manner, to learning of an acoustic model.

As has been described above, the conventional dereverberation methods require large computation amounts or previous knowledge (such as a reverberation time of a room). If a large computation amount is required, it is impossible in practice to implement any of the methods in an embedded type automatic speech recognition apparatus that must use a low CPU resource, and meet the need for real-time responses. Additionally, after an automatic speech recognition apparatus is delivered to a user, the previous knowledge such as a reverberation time of a room cannot be utilized.

SUMMARY OF THE INVENTION

The present invention provides a method for processing speech signal data of at least one speech signal through use of a computing apparatus, the time domain of each speech signal divided into a plurality of frames, each frame characterized by a frame number T representing a unique interval of time, each speech signal characterized by a power spectrum with respect to frame T and frequency band ω of a plurality of frequency bands into which a frequency range of each speech signal has been divided, said method comprising:

determining a speech segment of a first speech signal, said speech segment consisting of a first set of frames of the plurality of frames of the first signal;

determining a reverberation segment of the first speech signal, said reverberation segment consisting of a second set of frames of the plurality of frames of the first signal;

computing L filter coefficients W(k) (k=1, 2, . . . , L) respectively corresponding to L frames immediately preceding frame T such that the L filter coefficients minimize a function Φ in accordance with a set of equations for Φ consisting of:

$$\Phi = G_{Tail} \cdot \phi_{Tail} + G_{Speech} \cdot \phi_{Speech}$$

$$\phi_{Tail} = \sum_{T \in Tail} \sum_{\omega} \left\{ X_\omega(T) - \sum_{k=1}^{L} W(k) \cdot X_\omega(T-k) \right\}^2$$

$$\phi_{Speech} = \sum_{T \in Speech} \sum_{\omega} \left\{ \sum_{l=1}^{L} W(l) \cdot X_\omega(T-l) \right\}^2$$

wherein $X_\omega(T)$ denotes a power spectrum of the first speech signal, wherein $G_{Tail}$ and $G_{Speech}$ are weighting coefficients, wherein the frames T in the summation over T∈Speech encompass the first set of frames in the speech segment, wherein the frames T in the summation over T∈Tail encompass the second set of frames in the reverberation segment, and wherein the frequency bands in the summation over ω encompass the plurality of frequency bands; and storing the computed L filter coefficients within storage media of the computing apparatus.

BRIEF DESCRIPTION OF THE DRAWINGS

For a more complete understanding of the present invention and the advantage thereof, reference is now made to the following description taken in conjunction with the accompanying drawings.

DETAILED DESCRIPTION OF THE INVENTION

Figure 1:
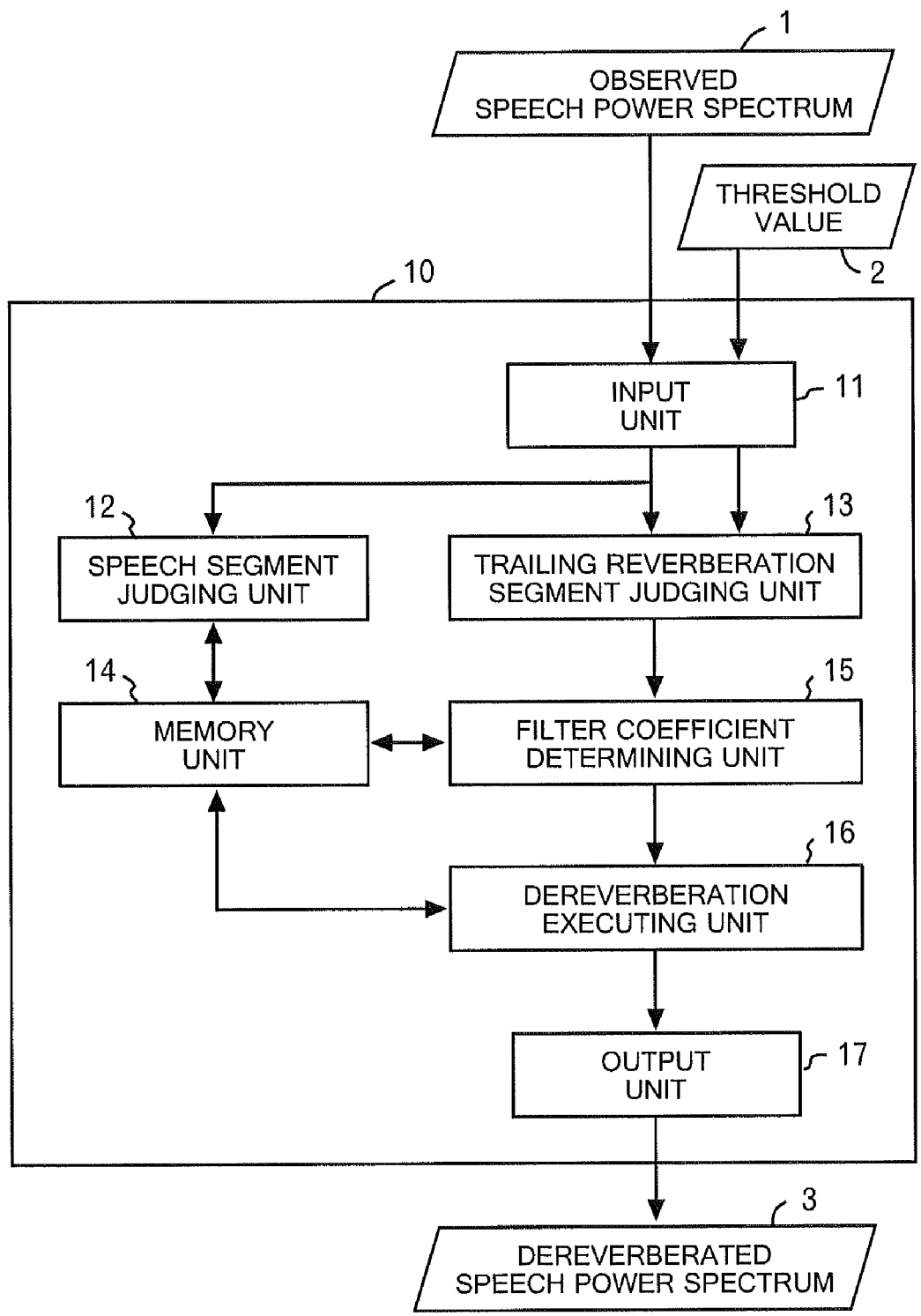
FIG. 1 is a diagram showing functional blocks of an information processing apparatus provided as one embodiment of the present invention.

The present invention provides a method which allows a recognition apparatus to have a satisfactory capability in practice as an embedded type recognition apparatus, and which is simple with a small computation amount being involved. Additionally, an additional necessary requirement for the recognition apparatus is to achieve less side-effect in an environment without reverberation.

The present invention provides a dereverberation method for finding a filter coefficient, wherein a speech power spectrum of a past frame multiplied by a filter coefficient is subtracted from a speech power spectrum of a current frame, the method being operable to determine the filter coefficient so that a weighted sum of a subtracted speech power in a speech segment and a residual speech power in a trailing reverberation segment is minimized. A power spectrum of a speech is the power output of the speech as a function of time and frequency. Here, "a frame" means a time interval in which a Fourier transform is performed on speech power spectra.

Furthermore, a trailing reverberation segment is obtained by: firstly finding a predetermined speech power track whose speed following a speech power changes according to the magnitude of the speech power; and secondly selecting, as the trailing reverberation segment, a segment where a difference between the speech power track and a speech power of the current frame smoothed in a time direction is larger than a predetermined threshold value.

The predetermined speech power track more quickly follows a frame having a larger speech power and more slowly follows a frame having a smaller speech power. Here, "to quickly follow" and "to slowly follow" mean, for example, that a coefficient $\alpha_h$ in Equations (1) supra is large, and that the coefficient $\alpha_h$ is small, respectively. While the above mentioned method of the present invention is realized by having a processor (a CPU) execute a computer program stored in a memory unit of a computer, the method can also be realized by combining a computer program with hardware such as an adder or a comparer.

A characteristic of the method of the present invention is to: find a smoothed speech power track (expressed as, for example, a later described function S(T) in terms of frame number T), a high track which more quickly follows a frame having a larger speech power (expressed as, for example, later described P(T)), and a low track which more quickly follows a frame having a smaller speech power (expressed as, for example, later described Q(T)); determine, as the trailing reverberation segment, a segment where a difference between the high track and the speech power track of the current frame smoothed in a time direction is large; and determine the filter coefficient so that a weighted sum of a residual speech power in the trailing reverberation segment and a subtracted speech power in the speech segment can be minimized. Additionally, an apparatus can be used to implement the present invention and a program can be employed to cause a computer to function as the apparatus for implementing the invention.

FIG. 1 is a diagram showing functional blocks of an information processing apparatus 10 provided as one embodiment of the present invention. This apparatus 10 is composed of an input unit 11, an output unit 17, a speech segment judging unit 12, a trailing reverberation segment judging unit 13, a memory unit 14, a filter coefficient determining unit 15 and a dereverberation executing unit 16.

To this apparatus 10, an observed speech power spectrum 1 associated with a speech signal and a threshold value 2 used for later described segment determination are inputted through the input unit 11. The inputted observed speech power spectrum 1 is divided into a plurality of frames, and is subjected to subsequent processing steps by this frame. By having the threshold value previously held as a default value in the memory unit 14 within the apparatus, inputting of the threshold value 2 may be skipped as long as there is no change in the threshold value.

The speech signal is characterized by the speech power spectrum 1 which is a function of time and frequency. The power spectrum 1 is expressed as $X_\omega(T)$, wherein T is a frame number denoting a unique interval in time, and wherein $\omega$ is a frequency band indicator denoting a range in frequency. Thus, the speech signal and associated power spectrum is divided into a plurality of frames. Each frequency band $\omega$ is comprised by a plurality of frequency bands into which a frequency range of the speech signal and associated power spectrum has been divided. The inputted speech signal is classified into a speech segment, a trailing reverberation segment, and may also include a noise segment. The speech segment consists of one or more frames which may be contiguously or non-contiguously distributed within the speech power spectrum. The trailing reverberation segment consists of one or more frames which may be contiguously or non-contiguously distributed within the speech power spectrum. The noise segment consists of one or more frames which may be contiguously or non-contiguously distributed within the speech power spectrum.

With respect to the inputted observed speech power spectrum 1, the inputted speech signal is divided into a speech segment and a trailing reverberation segment. The speech segment and the trailing reverberation segment are determined by the speech segment judging unit 12 and the trailing reverberation segment judging determining unit 13.

The filter coefficient judging unit 15 processes the power spectrum of observed speech frame by frame, and computes a filter coefficient used for dereverberation processing by using a method which will be described later in detail. The observed speech spectrum may be smoothed before this processing. Note that, although the observed speech is classified into the speech segment and the trailing reverberation segment, a segment which is not determined to be the speech segment or the trailing reverberation segment is regarded as a noise segment.

The dereverberation executing unit 16 finds, by using later described Equations (2), a dereverberated speech power spectrum 3 using the filter coefficient obtained in the above processing steps, from the observed speech power spectrum and outputs a result thereof to another system through the output unit 17.

Figure 2:
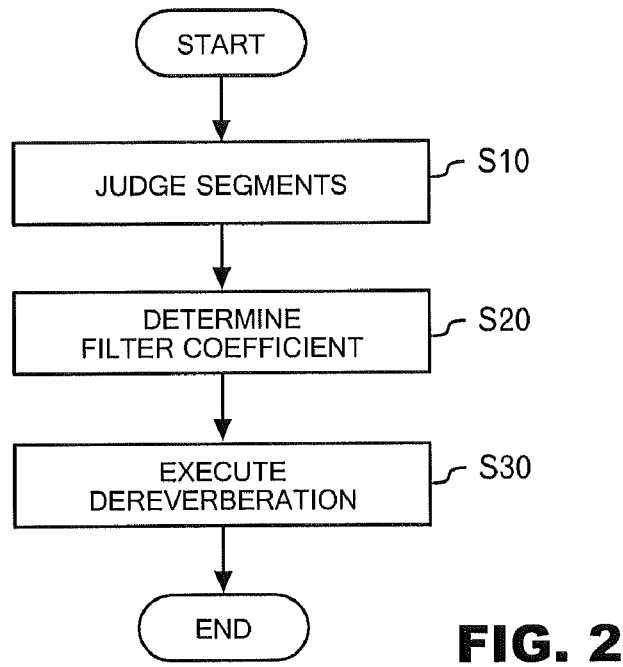
FIG. 2 is a diagram showing an entire flow of a processing method of the present invention.

FIG. 2 is a diagram showing an entire flow of the processing method of the present invention. A basic configuration of this processing is roughly divided into: step S10 in which the speech segment, the trailing reverberation segment, and the noise segment are judged (i.e., determined); step S20 in which the filter coefficient is determined; and step S30 in which dereverberation from the observed speech power spectrum is executed by using the filter coefficient. Details in each of the steps will be described below.

Step S10 determines the trailing reverberation segment and the speech segment for the dereverberation processing performed in the later step S30. Any one of various conventional technologies can be used for the determination of the speech segment. The following methods are examples of such technologies. Firstly, a zero intersection method is a method of counting the number of time-domain speech (PCM) intersecting a zero point, and assuming the part where the number is thickly counted to be the speech segment. Secondly, a method using likelihoods where features (cepstrum or the like) of the both speech and noise are modeled as a multidimensional Guassian distribution. Likelihoods of speech of the current frame (probability values when the speech is inputted to the respective models) are compared with one another. Thirdly, a method where a harmonic structure of the speech is detected, and a segment where the harmonic structure exists is assumed to be the speech segment.

However, a method of determining the reverberation segment of a speech tail-end is not so well known. In the current invention, the reverberation segment is determined by the following method.

In a reverberation environment, power variation in a tail end of a speech becomes more gradual than in an environment without reverberation because a spectrum is elongated in the time direction. A function P(T) which more quickly follows a frame having a larger speech power, and a function Q(T) which more quickly follows a frame having a smaller speech power are defined. Then, a segment where a difference between the function P(T) and a function S(T) which are smoothed speech power in the time direction becomes large is assumed as the reverberation segment. That is, it is a trailing reverberation segment where $P(T)-S(T) > \gamma$ (here, $\gamma$ denotes a specified threshold value).

Figure 3:
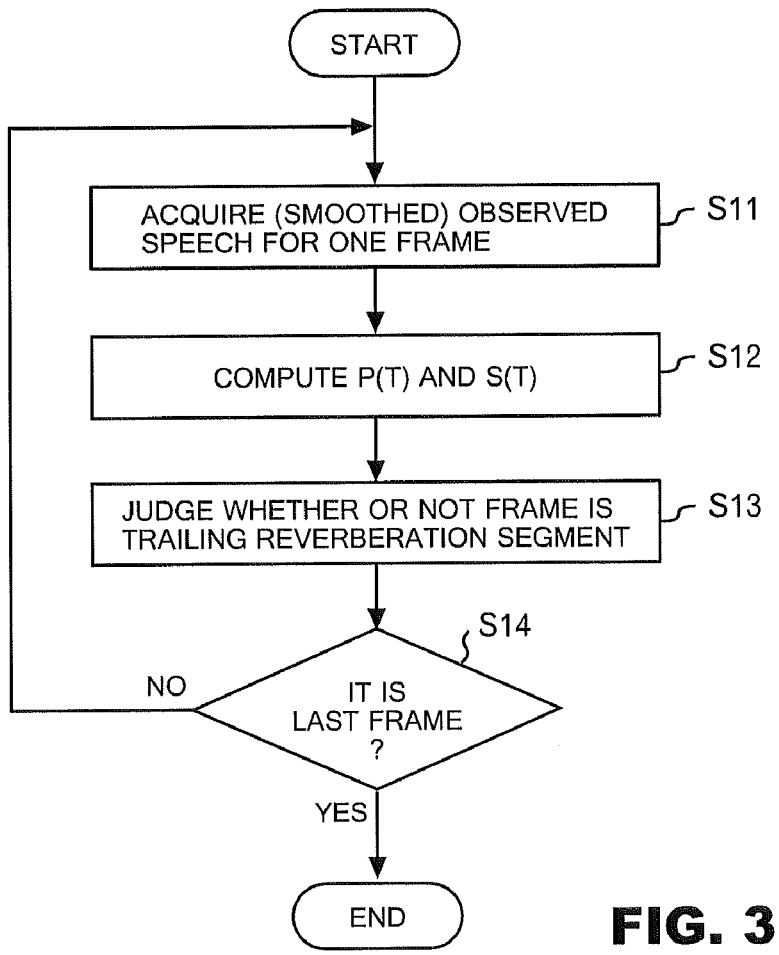
FIG. 3 is a diagram showing a detailed processing flow of segment determining steps.

FIG. 3 is a diagram showing a detailed processing flow of the aforementioned segment determining steps.

First, in step S11, observed speech for one frame is acquired. Next, in step S12, P(T) and S(T) is computed by using Equations (1). Then, in step S13, the judgment on whether or not the one frame is the trailing reverberation segment is made by using the foregoing method. Processing of these steps S11 to S13 iteratively in a loop is performed with respect to all of frames (step S14).

Although not shown in the drawings, the determination of the speech segment is made using various conventional methods as has been described above. Additionally, a segment which is neither the speech segment nor the trailing reverberation segment is classified as the noise segment.

The speech power is tracked via three different functions, namely P(T), S(T), and Q(T). Each of the tracks is defined as follows. Here, P(T) and S(T) are the speech tracks that are determined by Equations (1) supra. P(T), S(T), and Q(T) are also referred to as "RMS track," "high_track," and "low_track," respectively. A RMS track can is a smoothed power in the time direction. A high_track follows large peaks of a RMS track. A low track follows valleys of a RMS track. Note that P(T) may be smoothed over several consecutive frames including the one frame and frames before and after. Additionally, $\alpha_l$ and $\alpha_h$ are update factors. x[i] is a measure of the amplitude of an observed speech signal PCM (pulse coded modulation) data value i in a time-domain belonging to a frame T, wherein T is a frame number and N is a total number of PCM data values of the speech signal belonging to the frame number T. Additionally, C1, C2 and C3 are constants which are specified (e.g., as input).

$$\text{energy}(T) = 10.0 * \log 10\left(\frac{1}{N}\sum_{i=1}^{N} x[i]^2\right) \quad (1)$$

$$P(T) = 10^{C1*\text{energy}(T)}$$

$$Q(T) = (1 - \alpha_l) * Q(T-1) + \alpha_l * P(T)$$

$$\alpha_l = \frac{C2*C3*Q(T-1)^2}{P(T)^2}$$

$$S(T) = (1 - \alpha_h) * S(T-1) + \alpha_h * P(T)$$

$$\alpha_h = \frac{C3*P(T)^2}{Q(T-1)^2}$$

Figure 4:
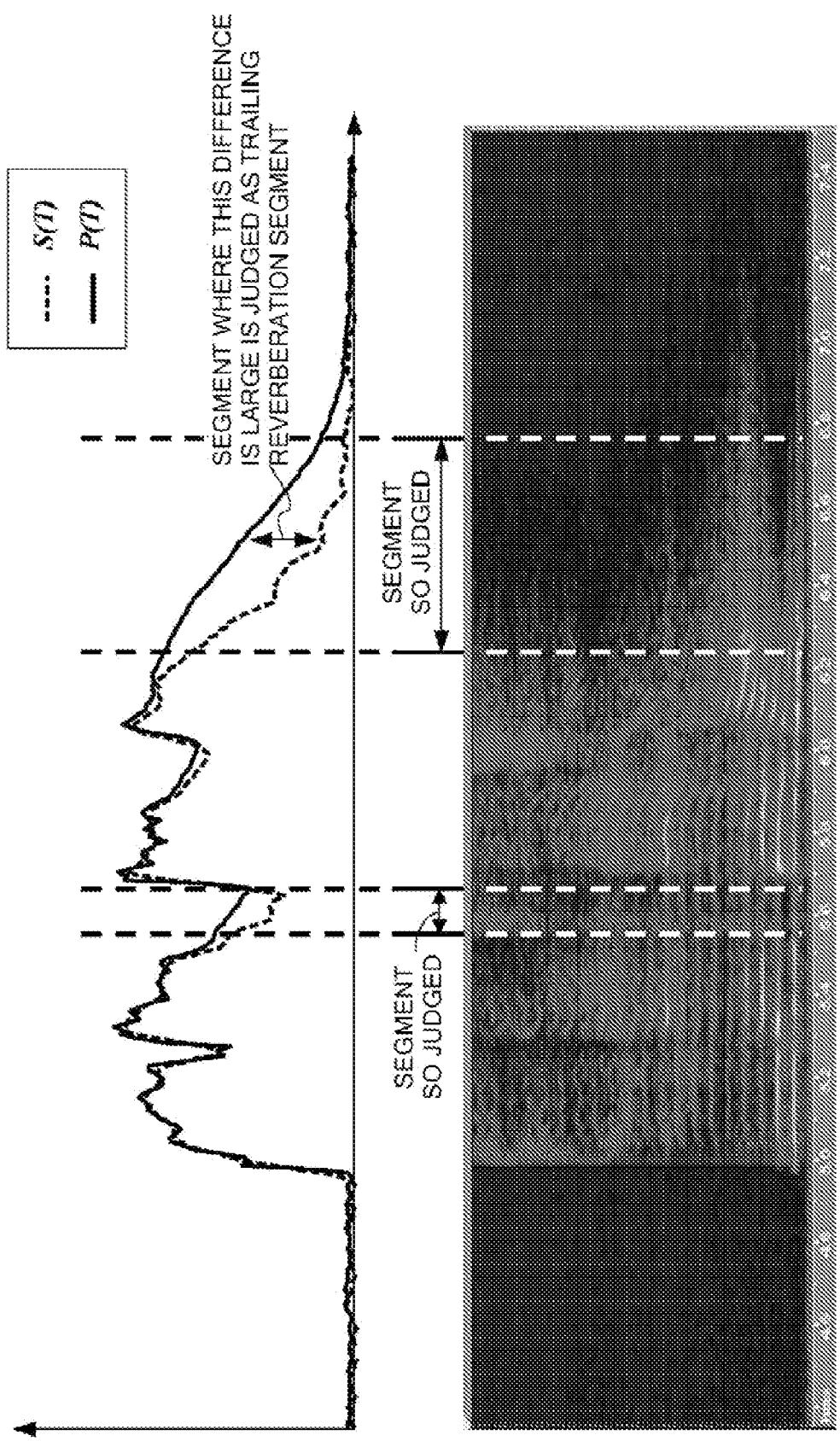
FIG. 4 is a chart showing an example of judgment of a reverberation segment in a tail end of a speech.

FIG. 4 is a chart showing an example of determining the trailing reverberation segment at the tail end of the speech. The trailing reverberation segment consists of a set of contiguous or non-contiguous frames in which a difference between S(T) and P(T) exceeds a specified threshold value γ.

The Filter Coefficient W(k) is determined as follows. The dereverberated speech is modeled as follows:

$$D_\omega(T) = X_\omega(T) - \sum_{k=1}^{L} W(k) \cdot X_\omega(T-k), \quad (2)$$

where $D_\omega(T)$ denotes a power spectrum of the dereverberated speech and W(k) is the filter coefficient. $X_\omega(T)$ is a power spectrum of the observed speech and is obtained as a square of the spectrum of the fast Fourier transform (FFT) for the input observed signal.

Note that T is a frame number, and L is a filter coefficient length equal to a specified number of frames preceding frame T and should be large enough to compensate the reverberation. Generally, L is a positive integer; e.g., L may equal 1, 2, 3, . . . , 10, 25, 50, 100, 500, etc. Each frame of the L frames preceding frame T is denoted by the index k in Equation (3) and the index l in Equation (4). The filter coefficient W(k) is independent of the frequency band ω. However, the de-reverberation denoted by Equation (2) is processed at each frequency band ω. Additionally, $X_\omega(T)$ may be subjected to smoothing treatment.

A square of a residual speech power in the trailing reverberation segment is considered via Equation (3).

$$\phi_{Tail} = \sum_{T \in Tail} \sum_\omega \left\{ X_\omega(T) - \sum_{k=1}^{L} W(k) \cdot X_\omega(T-k) \right\}^2 \quad (3)$$

In Equation (3), the summation over T (i.e., T∈Tail) encompasses the frames in the trailing reverberation segment.

A square of a subtracted speech power in the speech segment is considered via Equation (3).

$$\phi_{Speech} = \sum_{T \in Speech} \sum_\omega \left\{ \sum_{l=1}^{L} W(l) \cdot X_\omega(T-l) \right\}^2 \quad (4)$$

In Equation (4), the summation over T (i.e., T∈Speech) encompasses the frames in the speech segment.

Here, a weighted sum of the both squares from Equations (3) and (4) is defined as an evaluation function where $G_{Tail}$ and $G_{Speech}$ are weighting coefficients:

$$\Phi = G_{Tail} \cdot \phi_{Tail} + G_{Speech} \cdot \phi_{Speech} \quad (5)$$

Minimization of Φ is performed to determine W(k). That is, W(k) (k=1, . . . , L) can be found in the following manner from $$\frac{\partial \Phi}{\partial W(k)} = 0 \quad (6)$$

for k=1, 2, . . . , L. The following equations depict calculation of a matrix A of L×L dimensions, and of vectors B and C each of L dimensions, where L is the filter coefficient length indicated supra.

$$C = A \cdot B \quad (7)$$

$$A = \begin{bmatrix} G_{Tail\ or\ Speech} \cdot \sum_{T \in Tail\ or\ Speech} \sum_\omega X_\omega(T-1) \cdot X_\omega(T-1) & \cdots & G_{Tail\ or\ Speech} \cdot \sum_{T \in Tail\ or\ Speech} \sum_\omega X_\omega(T-L) \cdot X_\omega(T-1) \\ \vdots & \ddots & \vdots \\ G_{Tail\ or\ Speech} \cdot \sum_{T \in Tail\ or\ Speech} \sum_\omega X_\omega(T-1) \cdot X_\omega(T-L) & \cdots & G_{Tail\ or\ Speech} \cdot \sum_{T \in Tail\ or\ Speech} \sum_\omega X_\omega(T-L) \cdot X_\omega(T-L) \end{bmatrix}$$

$$B = \begin{bmatrix} W(1) \\ \vdots \\ W(L) \end{bmatrix}$$

$$C = \begin{bmatrix} G_{Tail} \cdot \sum_{T \in Tail} \sum_\omega X_\omega(T) \cdot X_\omega(T-1) \\ \vdots \\ G_{Tail} \cdot \sum_{T \in Tail} \sum_\omega X_\omega(T) \cdot X_\omega(T-L) \end{bmatrix}$$

The calculation of B via $B=A^{-1} \cdot C$ represents the solution to Equation (6) for W(k), k=1, 2, ..., L. It should be noted that W(k) must be nonnegative. When W(k)<0, W(k) is replaced by W(k)=0, B mentioned above may be found through repetitive computation of a relaxation method or the like. W(k) (k=1, 2, ..., L) as computed via Equations (7), and the aforementioned replacement of W(k) for the case of W(k)<0 for at least one value of k, are stored within storage media (e.g., the output unit 17 or any other storage medium) of the apparatus 10 (see FIG. 1) so as to make W(k) available for computing the dereverberated speech according to Equation (2) subject to flooring considerations described by Equation (11) as discussed infra.

With respect to the weighting coefficients, the following formulae may be used as one example. This can be considered as normalization by averages of speech powers.

$$G_{Tail} = \left\{ \frac{1}{N_{Tail}} \sum_{T \in Tail} \sum_{\omega} \{X_\omega(T)\} \right\}^{-2}, \qquad (8)$$

$$G_{Speech} = \left\{ \frac{1}{N_{Speech}} \sum_{T \in Speech} \sum_{\omega} \{X_\omega(T)\} \right\}^{-2}$$

Here, $N_{Tail}$ is a total number of frames in the trailing reverberation segment (T∈Tail). $N_{Speech}$ is a total number of frames in the speech segment (T∈Speech).

The aforementioned processing for finding W(k) can be performed at any one of the following various timings: (A), (B) and (C).

With timing (A), by having W(k) determined based on a speech made before a current speech, dereverberation of the current speech is performed by using W(k) thus determined.

With timing (B), by having a current speech stored in a buffer once, W(k) is determined by using the speech after the completion of the speech, and then, dereverberation of the current speech is performed.

With timing (C), W(k) can be found in a form (an online form) where W(k) is sequentially updated every time $X_\omega(T)$ is newly obtained.

Here, the online form means a manner in which updating of a filter, dereverberation, and outputting of dereverberated speech are simultaneously performed at the same time as the inflow of data (i.e., in real time). In contrast, an offline form means a manner in which: data is stored somewhere once in a large block such as a whole speech or the like; and, after the data is finished being stored, processing is performed slowly while taking a long computation time.

Timings (A) and (B) mentioned above are processing in the offline form. In timing (A), the filter coefficient W(k) used for dereverberation is calculated and saved at the point when the speech immediately before the current speech is completed. Then, dereverberation on the current speech is performed by using the thus determined filter coefficient. According to this manner, without having to wait for the completion of the current speech, dereverberated speech can be sequentially outputted.

On the other hand, in timing (B), after having waited for the completion of the current speech, updating of the filter, dereverberation, and outputting of the dereverberated speech are executed. That is, output of speech is not possible until the speech of inputted speech is completed.

The preceding embodiments of timings (A), (B), and (C) may be summarized as follows:

(1) The filter coefficients W(k) (k=1, 2, ..., L) are computed by minimizing Φ for a power spectrum $X_\omega(T)$ of a first speech signal in accordance with Equations (3)-(5) having a solution for W(k) specified by Equations (7).

(2) Since the filter coefficients must be nonnegative, nonnegative filter coefficients W'(k) are computed as follows. If the computed W(k) is nonnegative for k=1, 2, ..., L then W'(k)=W(k). If the computed W(k) is negative for at least one k of k=1, 2, ...L, then W'(k)=0 for the values of k at which the computed W(k) is negative and W'(k) is calculated via a repetitive relaxation procedure for the remaining values of k at which W(k) is computed.

(3) A dereverberated power spectrum $D'_\omega(T)$ is computed according to:

$$D'_\omega(T) = X'_\omega(T) - \sum_{k=1}^{L} W'(k) \cdot X'_\omega(T-k)$$

wherein $X'_\omega(T)$ is a power spectrum of a second speech signal for frame number T of frequency band ω.

(4) With timing (A), the second speech signal occurs after the first speech signal has ended, and dereverberation of the second speech signal is performed using the filter coefficients W(k) computed from the first speech signal.

(5) With timing (B), the second speech signal consists of the first speech signal.

(6) With timing (C), the second speech signal consists of the first speech signal and $X'_\omega(T)$ consists of $X_\omega(T)$. After said computing $D'_\omega(T)$ is preformed: a plurality of additional sets of speech signal frames is received. Then each additional set of speech signal frames is cumulatively added to the frames of the first speech signal to generate a corresponding power spectrum $X''_\omega(T)$ for each additional set of speech signal frames. After generating the power spectrum $X''_\omega(T)$ for each additional set of speech signal frames, updated L filter coefficients W''(k) (k=1, 2, ..., L) corresponding to power spectrum $X''_\omega(T)$ are computed in accordance with the set of equations (3)-(5) and (7) in which $X''_\omega(T)$ replaces $X_\omega(T)$ and W''(k) replaces W(k). Then an updated dereverberated power spectrum $D''_\omega(T)$ is computed according to:

$$D''_\omega(T) = X''_\omega(T) - \sum_{k=1}^{L} W''(k) \cdot X''_\omega(T-k) \qquad (9)$$

In one embodiment, each additional set of speech signal frames consists of one additional speech signal frame.

Figure 5:
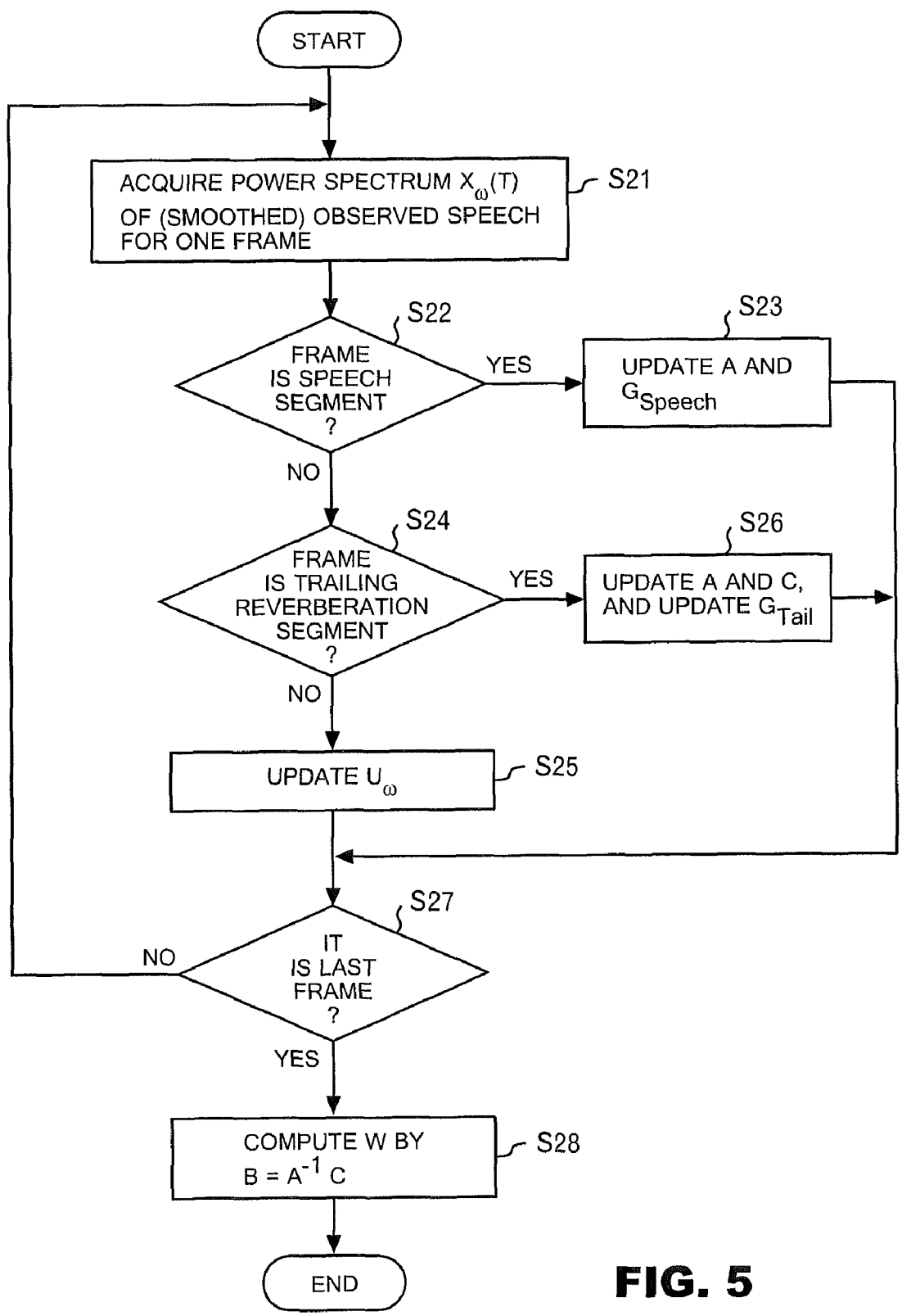
FIG. 5 is a diagram showing a detailed processing flow of filter coefficient determination steps.

FIG. 5 is a diagram showing a detailed processing flow of the above described filter coefficient determination steps.

In step S21, a power spectrum $X_\omega(T)$ of observed speech for one frame (T) is acquired. The observed speech may be smoothed before this processing. Next, in step S22, whether or not the one frame is within the speech segment is determined. For determining the speech segment, any one of conventional methods as have been already described may be used. If the one frame is within the speech segment, then processing moves on to step S23, and A and $G_{Speech}$ of Equations (7) and (8), respectively, are updated, followed by execution of step S27. If the one frame is not within the speech segment, whether or not the one frame is within the trailing reverberation segment is determined in step S24. If the one frame has been determined to be within the trailing reverberation segment, updating of A and C, and updating of $G_{Tail}$ (see Equation (8)) are performed in step S26, followed by execution of step S27. If the one frame has been determined not to be within the trailing reverberation segment, determination of a power spectrum $U_\omega$ of noise is made in step S25, in order to execute the later-described "flooring" process. $U_\omega$ is given as follows:

$$U_\omega = \frac{1}{N_{Noise}} \sum_{T \in Noise} X_\omega(T), \qquad (9)$$

where $N_{Noise}$ is a total number of frames in a segment which is neither the speech segment nor the trailing reverberation segment, that is, the noise segment (T∈Noise).

The processing of above steps S21 to S26 is performed iteratively in a loop until the processing is performed on the last frame as determined in step S27. Finally, in step S28, W is computed by $B = A^{-1} \cdot C$.

If W(k) is found, dereverberated speech can be found by the following formula in Equation (10), which is the same formula as in Equation (2).

$$D_\omega(T) = X_\omega(T) - \sum_{k=1}^{L} W(k) \cdot X_\omega(T-k) \qquad (10)$$

$D_\omega(T)$ may be outputted to storage media (e.g., output unit 17 or any other storage medium) within the apparatus 10 (see FIG. 1).

Thereafter, W(k) is subjected to flooring in the same manner as normal spectrum subtraction, and then is handed to an automatic speech recognition apparatus. Here, "flooring" means processing of not using a result of dereverberation and replacing it with an appropriate small positive value in a case where the result is negative or a very small value. The dereverberated speech power spectrum $Z_\omega(T)$, which accounts for the aforementioned flooring, is as follows.

$Z_\omega(T) = D_\omega(T)$ if $D_\omega(T) \geq \beta \cdot U_\omega$ $Z_\omega(T) = \beta \cdot U_\omega$ if $D_\omega(T) < \beta \cdot U_\omega$ (11)

where a flooring coefficient $\beta$ is a specified constant.

The speech power spectrum $Z_\omega(T)$, after the flooring, is outputted to storage media (e.g., output unit 17 or any other storage medium) within the automatic speech recognition apparatus 10 (see FIG. 1). Note that, in a case where an outputting destination is not a speech processing apparatus, it is not necessarily required to perform the flooring.

Figure 6:
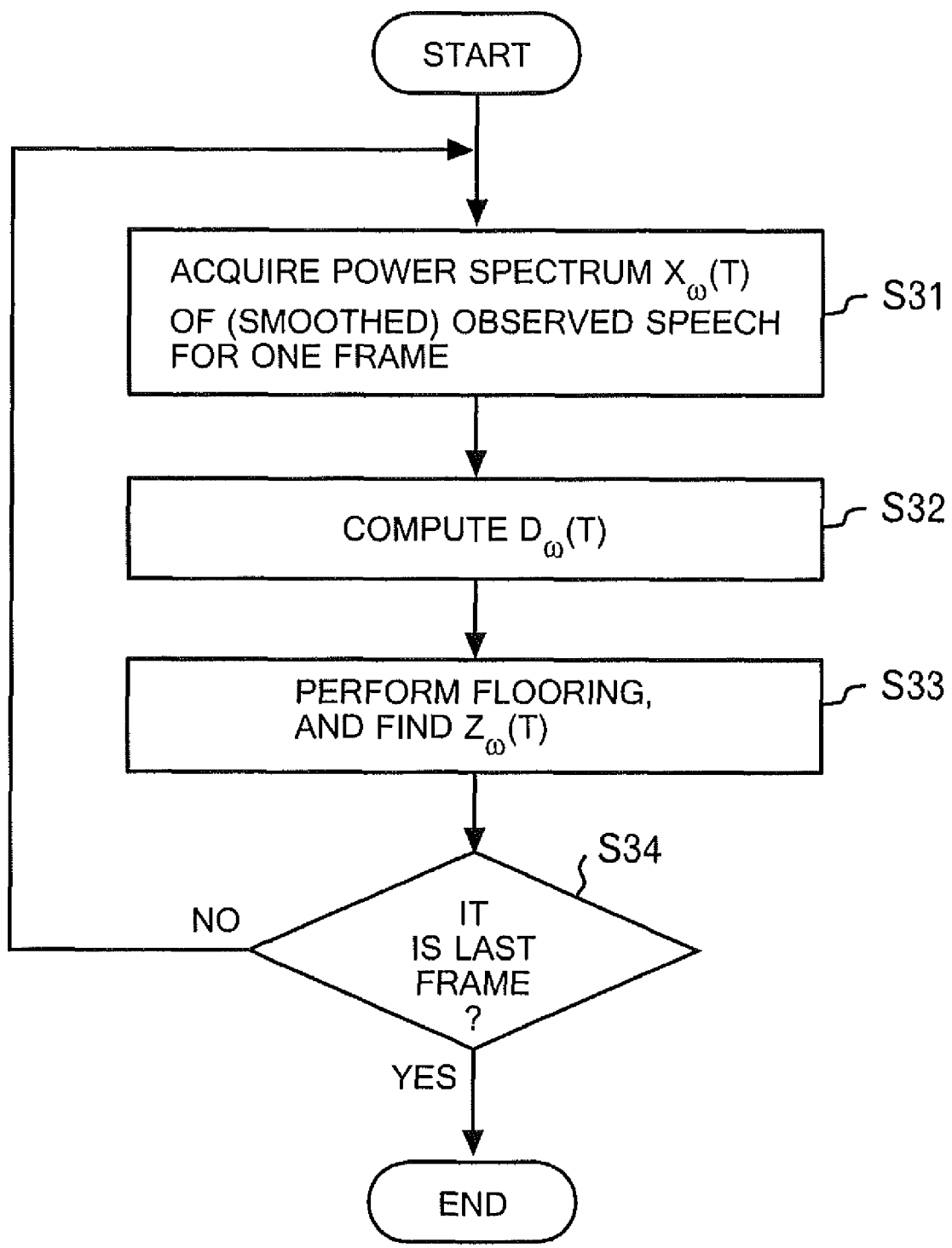
FIG. 6 is a diagram showing a detailed processing flow of dereverberation execution steps.

FIG. 6 is a diagram showing a detailed processing flow of the above described dereverberation processing steps.

In step S31, the power spectrum $X_\omega(T)$ of (smoothed) observed speech for one frame is acquired. Next, in step S32, a power spectrum $D_\omega(T)$ of dereverberated speech of the frame T is computed by Equation (2). Then, in step S33, the flooring processing is performed, and $Z_\omega(T)$ in Equations (11) is found. The processing of above steps S31 to S33 is performed iteratively in a loop until the processing is performed on the last frame (step S34), and then, a result thereof is outputted to the automatic speech recognition apparatus and/or the output unit 17 (see FIG. 1).

An assessment experiment was carried out for the purpose of verifying effects of the above described present invention. Assessment was made in a manner that impulse responses provided by an RWCP (Real World Computing Partnership) real-environment speech/sound database (Nishimura et al., "Construction of Real-environment Speech/Sound Database for Speech Recognition and for Understanding of Acoustic Environment," Proceedings of the Japanese Society for Artificial Intelligence JSAI Technical Report SIG-Challenge-0318-9, pp. 55-62) were superimposed on isolated-word speech (speech commands) collected. Assessment data were 1949 speeches in total made by 75 males and 75 females (each person made 10 to 12 speeches out of 366 lexemes). In this experiment, comparison of performance before and after dereverberation processing was made where reverberation periods as propagation characteristics were 0.3 sec., 0.43 sec, 0.6 sec. and 1.3 sec. In this experiment, a microphone was set to 2 meters distance from the sound source.

An acoustic model was a standard triphone HMM, and used as a characteristic parameter was a 39-dimensional parameter in which an MFCC (Mel Frequency Capstrum Coefficient) and a dynamic characteristic were combined with each other. The observed signal was sampled at 11 KHz frequency, and the time-domain signal was converted to Spectrum domain data by FFT at each 15 ms intervals. At the time of learning for the acoustic model, speech containing long reverberation like the speech used in the assessment was not used.

Figure 7:
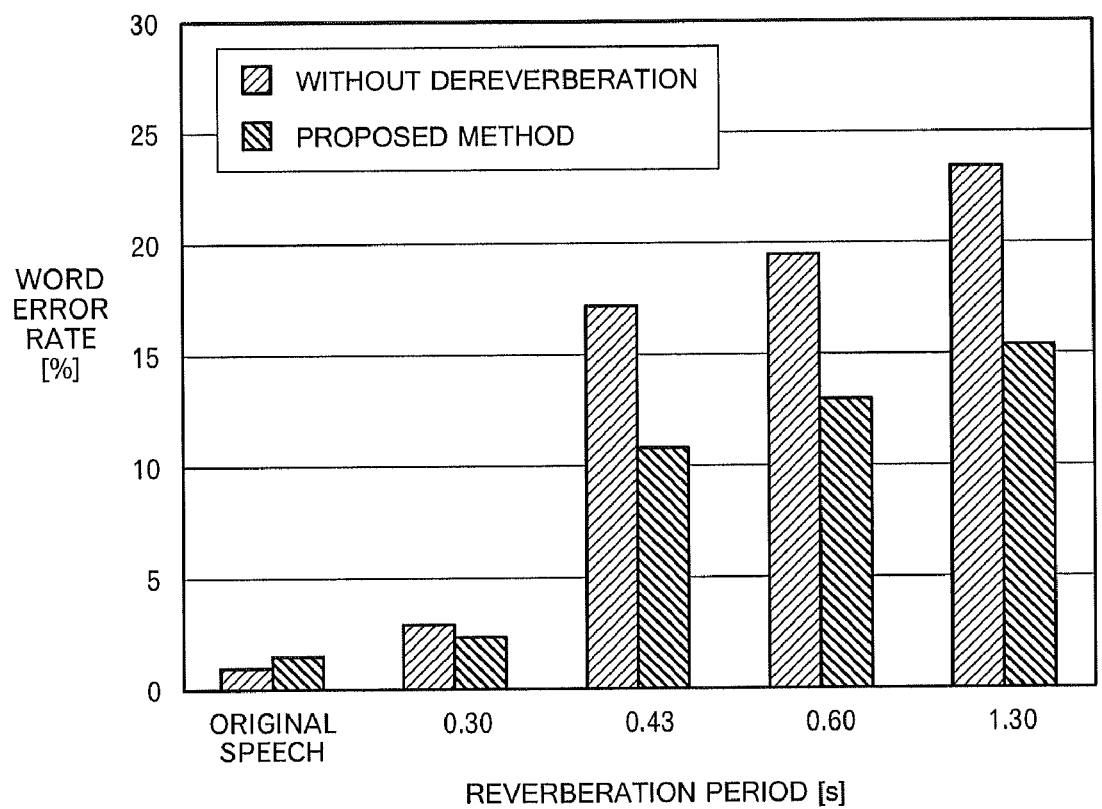
FIG. 7 is a graph showing experiment results of the present invention.

FIG. 7 is a graph showing experiment results. In this experiment, the filter coefficient length L was set to 20 frames, and reverberation was eliminated after determination of the filter coefficient was made with respect to each of the speeches. From these experiment results, it can be found that, when reverberation contained in speech is so long that a length thereof considerably exceeds the frame length, performance of the speech is considerably degraded (particularly in the cases where the reverberation periods were 0.43 sec and longer). The method of the present invention showed remarkable improvements with respect to speech containing long reverberation. In particular, errors were reduced from 19.5% to 13.1% (an error reduction rate of 32.8%) in the case where the reverberation period was 0.6 S, and errors were reduced from 23.5% to 15.3% (an error reduction rate of 34.9%) in the case where the reverberation period was 1.3 sec. The error reduction rate was computed as (original error rate−current error rate)/(original error rate).

Figure 8:
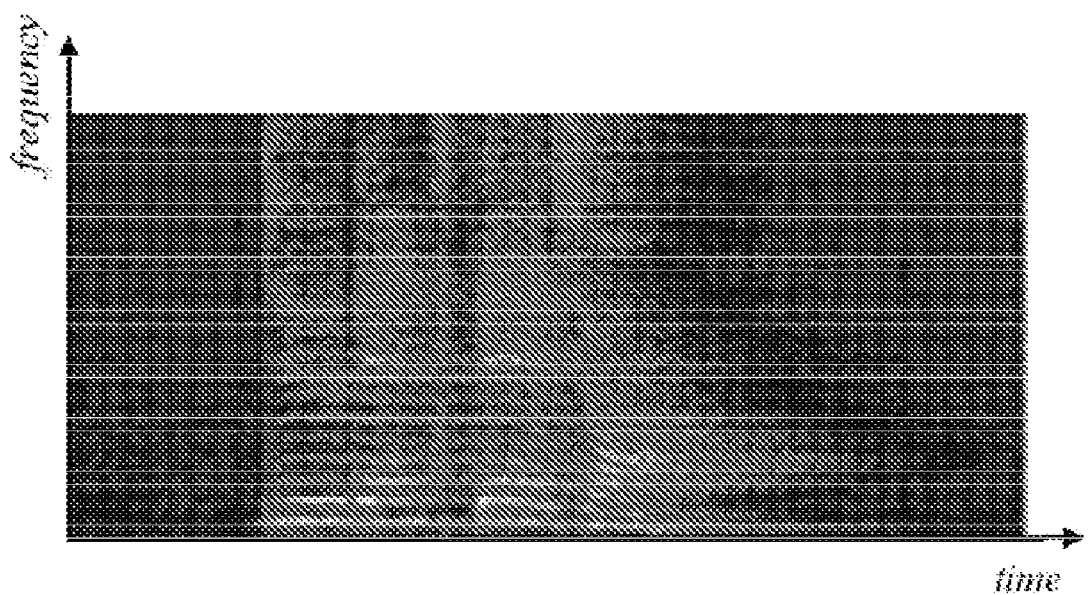
FIG. 8 is a chart showing speech power spectra before dereverberation.
Figure 9:
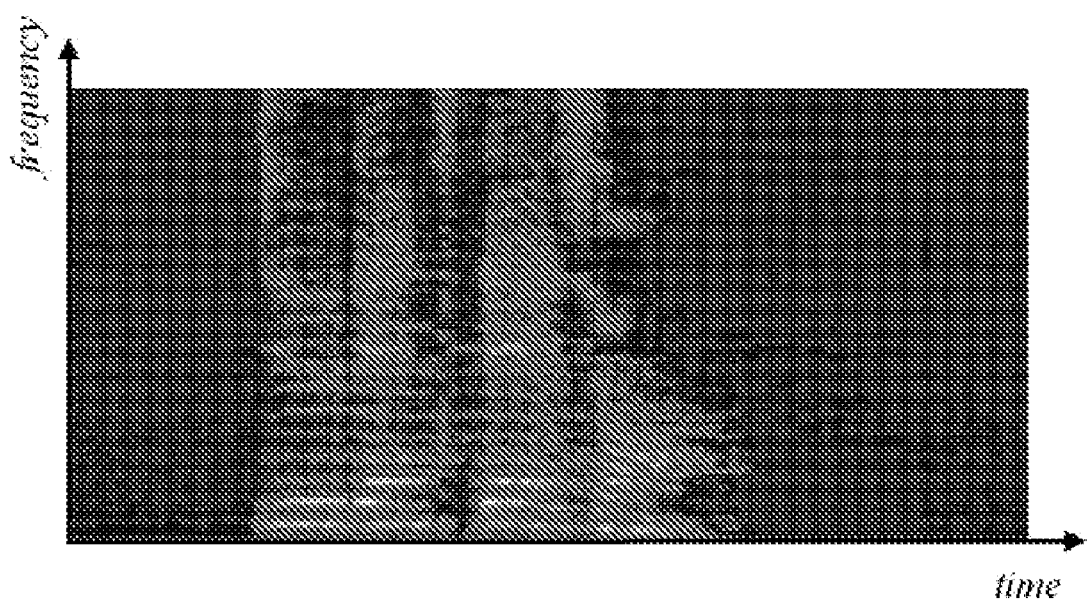
FIG. 9 is a chart showing speech power spectra after dereverberation.

FIGS. 8 and 9 are charts respectively showing speech power spectra before and after the dereverberation, respectively. By comparing the speech power spectra of both charts, it can be seen that the spectra in the reverberation parts following tail ends of speeches were suppressed by the method of the present invention.

Figure 10:
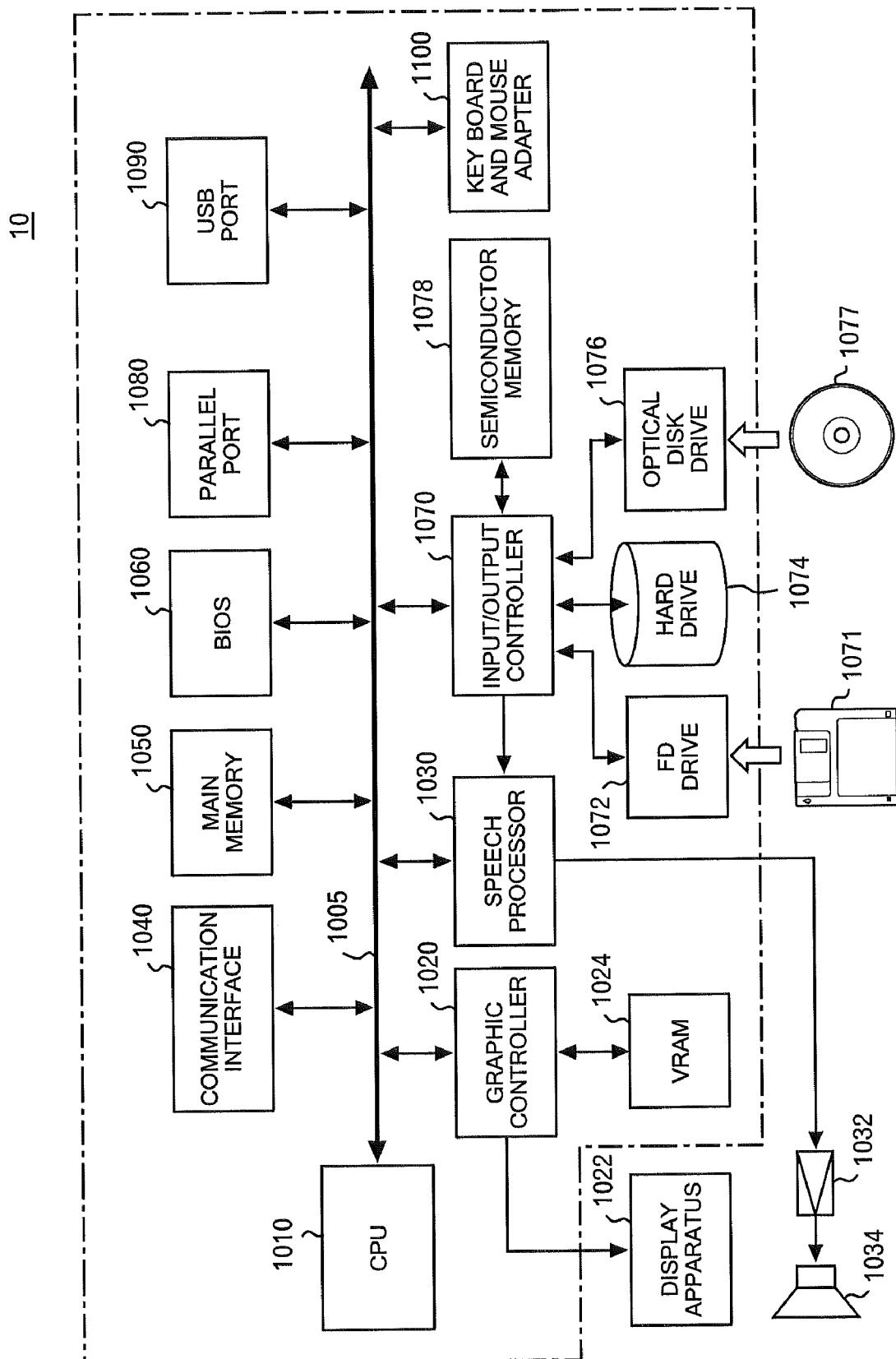
FIG. 10 is a diagram showing one example of a hardware configuration of the information processing apparatus 10 according to one embodiment of the present invention.

FIG. 10 is a diagram showing one example of a hardware configuration of an information processing apparatus 10 according to the one embodiment of the present invention. Although a general configuration for an information processing apparatus represented by a computer will be described below, it goes without saying that, in the case where the information processing apparatus 10 is an embedded apparatus, a required minimum configuration can be selected in accordance with an environment of the apparatus.

The information processing apparatus 10 includes: a CPU (Central Processing Unit) 1010; a bus line 1005; a communication interface 1040; a main memory 1050; a BIOS (Basic Input Output System) 1060; a parallel port 1080; a USB port 1090; a graphic controller 1020; a VRAM 1024; a speech processor 1030; an input/output controller 1070; and input means 1100 including a key board and a mouse adapter. Storage means such as a flexible disk (FD) drive 1072, a hard disk 1074, an optical disk drive 1076, and a semiconductor memory 1078 can be connected to the input/output controller 1070.

An amplifier circuit 1032 and a speaker 1034 are connected to the speech processor 1030. Additionally, there is a display apparatus 1022 connected to the graphic controller 1020.

The BIOS 1060 stores programs including: a boot program executed by the CPU 1010 at the startup of the information processing apparatus 10; and a program depending on hardware of the information processing apparatus 10. The FD (flexible disk) drive 1072 reads a program or data from a flexible disk 1071, and supplies the program or the data to the main memory 1050 or the hard disk 1074 through the input/output controller 1070.

For example, a DVD-ROM drive, a CD-ROM drive, a DVD-RAM drive, or a CD-RAM drive can be used as the optical disk drive 1076. When any one of these drives is used, it is necessary to use an optical disk 1077 designed for that drive. The optical disk drive 1076 can also read a program or data from a flexible disk 1071, and supply the program or data to the main memory 1050 or the hard disk 1074 through the input/output controller 1070.

A computer program provided to the information processing apparatus 10 is stored in a recording medium such as the flexible disk 1071, the optical disk 1077 or a memory card, and is provided by the user. This computer program is installed in the information processing apparatus 10 by being read from the recording medium through the input/output controller 1070, or by being downloaded from the communication interface 1040, and is executed thereby. Operations which the computer program causes the information processing apparatus 10 to execute are the same with those in the apparatus already described, and therefore, description thereof will be omitted.

The above described computer program may be stored in an external recording medium. As the recording medium, a magneto-optic recording medium such as an MD, or a tape medium may be used other than the flexible disk 1071, the optical disk 1077 or a memory card. Additionally, the program may be supplied to the information processing apparatus 10 through a communication network by using, as the recording medium, a storage device such as a hard disk or an optical disk library provided in a server system connected with a dedicated communication network or the Internet.

Although the information processing apparatus 10 has been mainly described in the above example, the same functions as those of the information processing system described in the above can be realized by installing, into a computer, a program having the functions described in connection with the information processing apparatus, and thereby causing the computer to operate as the information processing system. Accordingly, the information processing apparatus described as the one embodiment in the present invention can be realized also by a method and a computer program.

The apparatus of the present invention can be realized as hardware, software, or a combination of hardware and software. For implementation thereof by the combination of hardware and software, implementation by a computer system having a predetermined program can be cited as a representative example. In this case, by being loaded into and executed by the computer system, the predetermined program causes the computer system to execute processing according to the present invention. This program is composed of groups of instructions which can be expressed by any language, codes, or expressions. Each of those groups of instructions enables the system to execute a specific function directly, or after performance of one or both of the following steps (1) and (2). (1) Conversion into other languages, codes, or expressions. (2) Replication into another medium. Obviously, the present invention includes in the scope thereof not only such a program itself, but also a program product containing a medium in which the program is recorded. The program for executing the functions of the present invention can be stored in any computer-readable medium such as a flexible disc, an MO, a CD-ROM, a DVD, a hard disk device, a ROM, an MRAM, or a RAM. So as to be stored in the computer-readable medium, the program can be downloaded from another computer system, or be replicated from another medium. Additionally, the program can also be compressed to be stored in a single recording medium, or be divided into plural pieces to be stored in plural recording media.

According to the present invention, by using the proposed method, learning on the filter coefficients can be made so that reverberation can be eliminated as much as possible; that is, a filter coefficient can be large, in the trailing reverberation segment, and so that original sound reverberation can be prevented from degrading by a large filter coefficient; that is, a filter coefficient can be prevented from becoming too large in the speech segment. For this reason, in the method of the present invention, the coefficient automatically becomes small in an environment where reverberation is little, and there are few side-effects. Additionally, according to an experiment, through dereverberation using this method, automatic speech recognition capability improved with substantially no side-effects in various reverberation environments including an environment (a normal environment) without reverberation.

Although the present invention has been described based on the embodiment, the present invention is not limited to the embodiment. Additionally, the effects described in the embodiment of the present invention are merely a list of the most preferable effects brought about by the present invention, and effects of the present invention are not limited to those described in the embodiment or the examples of the present invention.

Lastly, the following fields can be considered as application fields of the present invention.

A first example comprises preprocessing of automatic speech recognition apparatuses in Robots. Reverberation is eliminated from inputted speech for preprocessing of automatic speech recognition apparatuses in robots, which may possibly be used in places, with much reverberation such as: a hall, a gymnasium, a basement, a corridor, an elevator, and a bathroom.

A second example comprises preprocessing of automatic speech recognition apparatuses in home electric appliances. Reverberation is eliminated from inputted speech for preprocessing of automatic speech recognition apparatuses expected to be applied in home electric appliances in the future.

A third example comprises dereverberation apparatuses in telephone conference systems. In telephone conference systems, listenability is improved by eliminating reverberation in conference rooms when voice is transmitted to a remote place.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for processing speech signal data of at least one speech signal through use of a computing apparatus, the time domain of each speech signal divided into a plurality of frames, each frame characterized by a frame number T representing a unique interval of time, each speech signal characterized by a power spectrum with respect to frame T and frequency band ω of a plurality of frequency bands into which a frequency range of each speech signal has been divided, said method comprising:

computing a speech segment of a first speech signal, said speech segment consisting of a first set of frames of the plurality of frames of the first signal;

determining a reverberation segment of the first speech signal, said reverberation segment consisting of a second set of frames of the plurality of frames of the first signal;

computing with the computing apparatus L filter coefficients W(k) (k=1, 2, . . . , L) respectively corresponding to L frames immediately preceding frame T such that the L filter coefficients minimize a function Φ in accordance with a set of equations for Φ consisting of:

$$\Phi = G_{Tail} \cdot \phi_{Tail} + G_{Speech} \cdot \phi_{Speech}$$

$$\phi_{Tail} = \sum_{T \in Tail} \sum_{\omega} \left\{ X_{\omega}(T) - \sum_{k=1}^{L} W(k) \cdot X_{\omega}(T-k) \right\}^2$$

$$\phi_{Speech} = \sum_{T \in Speech} \sum_{\omega} \left\{ \sum_{l=1}^{L} W(l) \cdot X_{\omega}(T-l) \right\}^2$$

wherein $X_{\omega}(T)$ denotes a power spectrum of the first speech signal, wherein $G_{Tail}$ and $G_{Speech}$ are weighting coefficients, wherein the frames T in the summation over T ∈ Speech encompass the first set of frames in the speech segment, wherein the frames T in the summation over T ∈ Tail encompass the second set of frames in the reverberation segment, and wherein the frequency bands in the summation over ω encompass the plurality of frequency bands; and storing the computed L filter coefficients within storage media of the computing apparatus.

2. The method of claim 1, wherein said computing the reverberation segment comprises:

computing speech tracks S(T) and P(T); and assigning to the reverberation segment those frames of the plurality of frames of the first speech signal that satisfy P(T)−S(T)>γ, wherein γ denotes a specified threshold value, and wherein said computing speech tracks S(T) and P(T) are performed in accordance with the equations of:

$$\text{energy}(T) = 10.0 * \log 10 \left( \frac{1}{N} \sum_{i=1}^{N} x[i]^2 \right)$$

$$P(T) = 10^{C1 * \text{energy}(T)}$$

$$Q(T) = (1 - \alpha_l) * Q(T-1) + \alpha_l * P(T)$$

$$\alpha_l = \frac{C2 * C3 * Q(T-1)^2}{P(T)^2}$$

$$S(T) = (1 - \alpha_h) * S(T-1) + \alpha_h * P(T)$$

$$\alpha_h = \frac{C3 * P(T)^2}{Q(T-1)^2}$$

wherein x[i] is a measure of the amplitude of an observed speech signal pulse coded modulation (PCM) data value i in frame T, wherein N is a total number of PCM data values in the frame T, and wherein C1, C2, and C3 are specified constants.

3. The method of claim 1, wherein the method further comprises computing $G_{Tail}$ and $G_{Speech}$ according to the equations of:

$$G_{Tail} = \left\{ \frac{1}{N_{Tail}} \sum_{T \in Tail} \sum_{\omega} \{X_{\omega}(T)\} \right\}^{-2}$$

$$G_{Speech} = \left\{ \frac{1}{N_{Speech}} \sum_{T \in Speech} \sum_{\omega} \{X_{\omega}(T)\} \right\}^{-2}$$

wherein $N_{Tail}$ is the total number of frames in the trailing reverberation segment (T ∈ Tail), and wherein $N_{Speech}$ is the total number of frames in the speech segment (T ∈ Speech).

4. The method of claim 1, wherein said computing the L filter coefficients comprises:

computing a matrix A;

computing a vector C; and computing a vector C according to B=A$^{-1}$·C, wherein $$C = A \cdot B$$

$$A = \begin{bmatrix} G_{Tail\ or\ Speech} \cdot \sum_{T \in Tail\ or\ Speech} \sum_{\omega} X_{\omega}(T-1) \cdot X_{\omega}(T-1) & \cdots & G_{Tail\ or\ Speech} \cdot \sum_{T \in Tail\ or\ Speech} \sum_{\omega} X_{\omega}(T-L) \cdot X_{\omega}(T-1) \\ \vdots & \ddots & \vdots \\ G_{Tail\ or\ Speech} \cdot \sum_{T \in Tail\ or\ Speech} \sum_{\omega} X_{\omega}(T-1) \cdot X_{\omega}(T-L) & \cdots & G_{Tail\ or\ Speech} \cdot \sum_{T \in Tail\ or\ Speech} \sum_{\omega} X_{\omega}(T-L) \cdot X_{\omega}(T-L) \end{bmatrix}$$

$$B = \begin{bmatrix} W(1) \\ \vdots \\ W(L) \end{bmatrix}$$

-continued $$C = \begin{bmatrix} G_{Tail} \cdot \sum_{T \in Tail} \sum_{\omega} X_{\omega}(T) \cdot X_{\omega}(T-1) \\ \vdots \\ G_{Tail} \cdot \sum_{T \in Tail} \sum_{\omega} X_{\omega}(T) \cdot X_{\omega}(T-L) \end{bmatrix}$$

5. The method of claim 1, wherein the method further comprises:
computing a dereverberated power spectrum $D'_{\omega}(T)$ according to:

$$D'_{\omega}(T) = X'_{\omega}(T) - \sum_{k=1}^{L} W'(k) \cdot X'_{\omega}(T-k)$$

wherein $X'_{\omega}(T)$ is a power spectrum of a second speech signal for frame number T of frequency band ω, wherein if the computed W(k) is nonnegative for k=1, 2, . . . , L then W'(k)=W(k), and wherein if the computed W(k) is negative for at least one k of k=1, 2, . . . L then setting W'(k)=0 for the values of k at which the computed W(k) is negative and calculating W'(k) via a repetitive relaxation procedure for the values of k at which the computed W(k) is nonnegative; and
storing the computed $D'_{\omega}(T)$ within the storage media of the computing apparatus.

6. The method of claim 5, wherein the computed W(k) is nonnegative for k=1, 2, . . . , L.

7. The method of claim 5, wherein the computed W(k) is negative for at least one k of k=1, 2, . . . L.

8. The method of claim 5, wherein the method further comprises:
determining a noise segment consisting of $N_{Noise}$ frames of the plurality of frames of the first signal, wherein the $N_{Noise}$ frames are not comprised by either the speech segment or the reverberation segment;
computing a noise spectrum $U_{\omega}$ of the first speech signal via $$U_{\omega} = \frac{1}{N_{Noise}} \sum_{T \in Noise} X_{\omega}(T)$$

wherein the frames T in the summation over T ∈ Noise encompass the $N_{Noise}$ frames in the noise segment;
if $D'_{\omega}(T) \geq \beta U_{\omega}$ such that β is a specified constant, then setting a dereverberated power spectrum $Z_{\omega}(T)=D'_{\omega}(T)$ otherwise setting $Z_{\omega}(T)=\beta U_{\omega}$; and
storing $Z_{\omega}(T)$ within the storage media of the computing apparatus.

9. The method of claim 5, wherein the second speech signal consists of the first speech.

10. The method of claim 5, wherein the second speech signal occurs after the first speech signal has ended.

11. The method of claim 5, wherein the second speech signal consists of the first speech signal and $X'_{\omega}(T)$ consists of $X_{\omega}(T)$, and wherein the method further comprises after said computing $D'_{\omega}(T)$:
receiving a plurality of additional sets of speech signal frames;
cumulatively adding each additional set of speech signal frames to the frames of the first speech signal to generate a corresponding power spectrum $X''_{\omega}(T)$ for each additional set of speech signal frames; and after generating the power spectrum $X''_{\omega}(T)$ for each additional set of speech signal frames: computing updated L filter coefficients W''(k) (k=1, 2, . . . , L) corresponding to power spectrum $X''_{\omega}(T)$ in accordance with the set of equations for Φ in which $X''_{\omega}(T)$ replaces $X_{\omega}(T)$ and W''(k) replaces W(k); and computing an updated dereverberated power spectrum $D''_{\omega}(T)$ according to:

$$D''_{\omega}(T) = X''_{\omega}(T) - \sum_{k=1}^{L} W''(k) \cdot X''_{\omega}(T-k).$$

12. The method of claim 11, wherein each additional set of speech signal frames consists of one additional speech signal frame.

13. A method for processing speech signal data of at least one speech signal through use of a computing apparatus, the time domain of each speech signal divided into a plurality of frames, each frame characterized by a frame number T representing a unique interval of time, each speech signal characterized by a power spectrum with respect to frame T and frequency band ω of a plurality of frequency bands into which a frequency range of each speech signal has been divided, said method comprising:
determining a speech segment of a first speech signal, said speech segment consisting of a first set of frames of the plurality of frames of the first signal;
computing a reverberation segment of the first speech signal, said reverberation segment consisting of a second set of frames of the plurality of frames of the first signal;
computing with the computing apparatus L filter coefficients W(k) (k=1, 2, . . . , L) respectively corresponding to L frames immediately preceding frame T such that the L filter coefficients minimize a function Φ in accordance with a set of equations for Φ consisting of:

$$\Phi = G_{Tail} \cdot \phi_{Tail} + G_{Speech} \cdot \phi_{Speech}$$

$$\phi_{Tail} = \sum_{T \in Tail} \sum_{\omega} \left\{ X_{\omega}(T) - \sum_{k=1}^{L} W(k) \cdot X_{\omega}(T-k) \right\}^2$$

$$\phi_{Speech} = \sum_{T \in Speech} \sum_{\omega} \left\{ \sum_{l=1}^{L} W(l) \cdot X_{\omega}(T-l) \right\}^2$$

wherein $X_{\omega}(T)$ denotes a power spectrum of the first speech signal, wherein $G_{Tail}$ and $G_{Speech}$ are weighting coefficients, wherein the frames T in the summation over T∈Speech encompass the first set of frames in the speech segment, wherein the frames T in the summation over T∈Tail encompass the second set of frames in the reverberation segment, and wherein the frequency bands in the summation over ω encompass the plurality of frequency bands; and storing the computed L filter coefficients within storage media of the computing apparatus.

wherein said computing the reverberation segment comprises:
computing speech tracks S(T) and P(T); and
assigning to the reverberation segment those frames of the plurality of frames of the first speech signal that satisfy P(T)−S(T)>γ, wherein γ denotes a specified threshold value, and wherein said computing speech tracks S(T) and P(T) are performed in accordance with the equations of:

$$energy(T) = 10.0 * \log 10 \left( \frac{1}{N} \sum_{i=1}^{N} x[i]^2 \right)$$

$$P(T) = 10^{C1*energy(T)}$$

$$Q(T) = (1 - \alpha_l) * Q(T-1) + \alpha_l * P(T)$$

$$\alpha_l = \frac{C2 * C3 * Q(T-1)^2}{P(T)^2}$$

$$S(T) = (1 - \alpha_h) * S(T-1) + \alpha_h * P(T)$$

$$\alpha_h = \frac{C3 * P(T)^2}{Q(T-1)^2}$$

wherein x[i] is a measure of the amplitude of an observed speech signal pulse coded modulation (PCM) data value i in frame T, wherein N is a total number of PCM data values in the frame T, and wherein C1, C2, and C3 are specified constants;

wherein the method further comprises computing $G_{Tail}$ and $G_{Speech}$ according to the equations of:

$$G_{Tail} = \left\{ \frac{1}{N_{Tail}} \sum_{T \in Tail} \sum_{\omega} \{X_\omega(T)\} \right\}^{-2}$$

$$G_{Speech} = \left\{ \frac{1}{N_{Speech}} \sum_{T \in Speech} \sum_{\omega} \{X_\omega(T)\} \right\}^{-2}$$

wherein $N_{Tail}$ is the total number of frames in the trailing reverberation segment (T∈Tail), and wherein $N_{Speech}$ is the total number of frames in the speech segment (T∈Speech);

wherein said computing the L filter coefficients comprises:
computing a matrix A;
computing a vector C; and
computing a vector C according to B=A$^{-1}$·C, wherein $$C = A \cdot B$$

$$A = \begin{bmatrix} G_{Tail\ or\ Speech} \cdot \sum_{T \in Tail\ or\ Speech} \sum_{\omega} X_\omega(T-1) \cdot X_\omega(T-1) & \cdots & G_{Tail\ or\ Speech} \cdot \sum_{T \in Tail\ or\ Speech} \sum_{\omega} X_\omega(T-L) \cdot X_\omega(T-1) \\ \vdots & \ddots & \vdots \\ G_{Tail\ or\ Speach} \cdot \sum_{T \in Tail\ or\ Speach} \sum_{\omega} X_\omega(T-1) \cdot X_\omega(T-L) & \cdots & G_{Tail\ or\ Speech} \cdot \sum_{T \in Tail\ or\ Speech} \sum_{\omega} X_\omega(T-L) \cdot X_\omega(T-L) \end{bmatrix}$$

$$B = \begin{bmatrix} W(1) \\ \vdots \\ W(L) \end{bmatrix}$$

$$C = \begin{bmatrix} G_{Tail} \cdot \sum_{T \in Tail} \sum_{\omega} X_\omega(T) \cdot X_\omega(T-1) \\ \vdots \\ G_{Tail} \cdot \sum_{T \in Tail} \sum_{\omega} X_\omega(T) \cdot X_\omega(T-L) \end{bmatrix}$$

wherein the method further comprises:
computing a dereverberated power spectrum D'$_\omega$(T) according to:

$$D'_\omega(T) = X'_\omega(T) - \sum_{k=1}^{L} W'(k) \cdot X'_\omega(T-k)$$

wherein X'$_\omega$(T) is a power spectrum of a second speech signal for frame number T of frequency band ω, wherein if the computed W(k) is nonnegative for k=1, 2, . . . , L then W'(k)=W(k), and wherein if the computed W(k) is negative for at least one k of k=1, 2, . . . L then setting W'(k)=0 for the values of k at which the computed W(k) is negative and calculating W'(k) via a repetitive relaxation procedure for the values of k at which the computed W(k) is nonnegative; and
storing the computed D'$_\omega$(T) within the storage media of the computing apparatus;
wherein the computed W(k) is nonnegative for k=1, 2, . . . , L;
wherein the method further comprises:
determining a noise segment consisting of $N_{Noise}$ frames of the plurality of frames of the first signal, wherein the $N_{Noise}$ frames are not comprised by either the speech segment or the reverberation segment;
computing a noise spectrum U$_\omega$ of the first speech signal via $$U_\omega = \frac{1}{N_{Noise}} \sum_{T \in Noise} X_\omega(T)$$

wherein the frames T in the summation over T∈Noise encompass the $N_{Noise}$ frames in the noise segment;
if D'$_\omega$(T)≧βU$_\omega$ such that β is a specified constant, then setting a dereverberated power spectrum Z$_\omega$(T)=D'$_\omega$(T) otherwise setting Z$_\omega$(T)=βU$_\omega$; and
storing Z$_\omega$(T) within the storage media of the computing apparatus;
wherein the second speech signal consists of the first speech signal and X'$_\omega$(T) consists of X$_\omega$(T), and wherein the method further comprises after said computing D'$_\omega$(T):
receiving a plurality of additional sets of speech signal frames;
cumulatatively adding each additional set of speech signal frames to the frames of the first speech signal to generate a corresponding power spectrum X"$_\omega$(T) for each additional set of speech signal frames; and after generating the power spectrum $X''_\omega(T)$ for each additional set of speech signal frames: computing updated L filter coefficients $W''(k)$ (k=1, 2, ..., L) corresponding to power spectrum $X''_\omega(T)$ in accordance with the set of equations for $\Phi$ in which $X''_\omega(T)$ replaces $X_\omega(T)$ and $W''(k)$ replaces $W(k)$; and computing an updated dereverberated power spectrum $D''_\omega(T)$ according to:

$$D''_\omega(T) = X''_\omega(T) - \sum_{k=1}^{L} W''(k) \cdot X''_\omega(T-k).$$

* * * * *